United States Patent Office 2,715,839
Patented Aug. 23, 1955

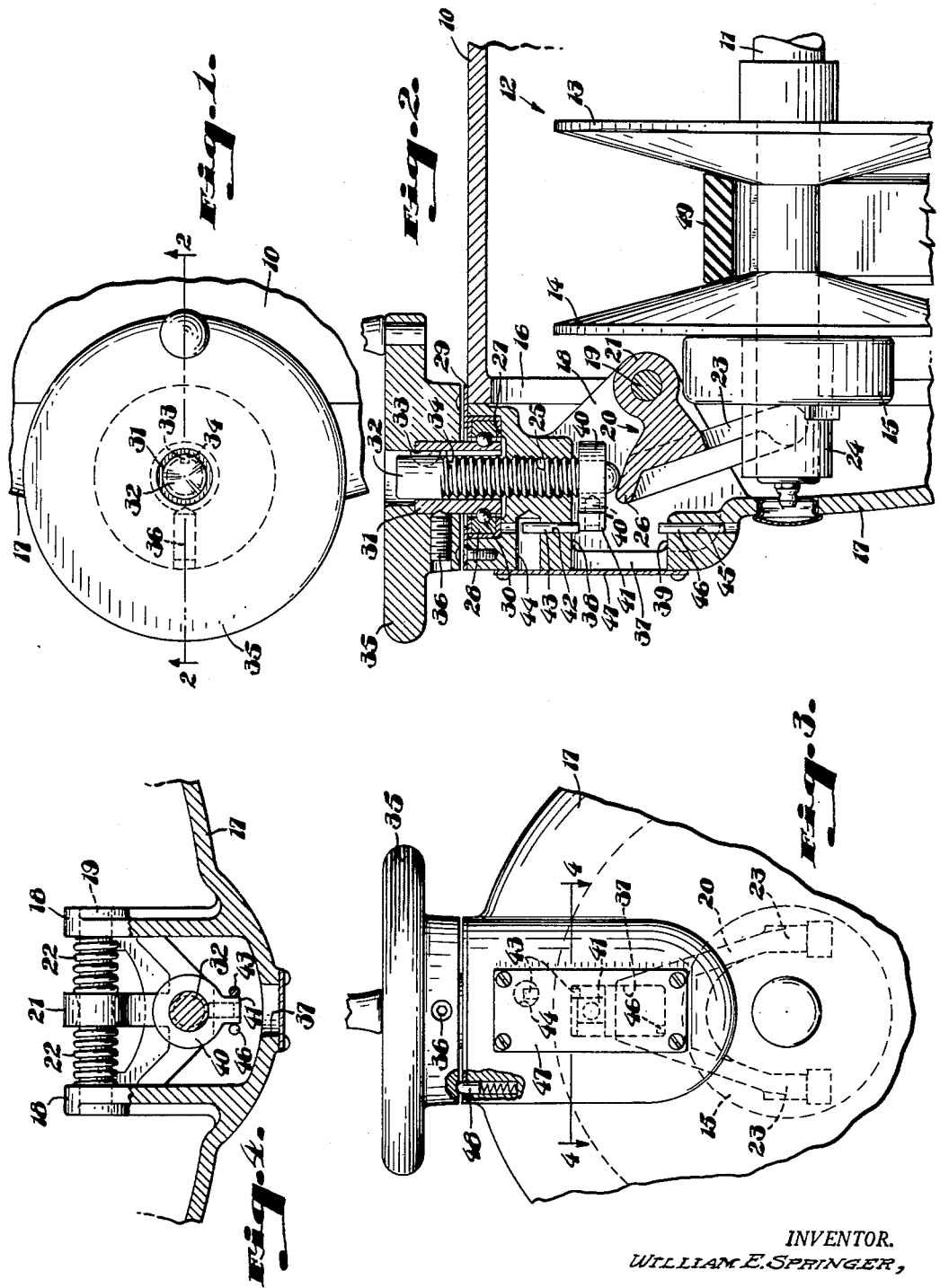

2,715,839

ACTUATING MECHANISM FOR RECIPROCABLE ELEMENT

William E. Springer, Columbus, Ind., assignor, by mesne assignments, to Reliance Electric and Engineering Company, Cleveland, Ohio, a corporation of Ohio Application December 16, 1953, Serial No. 398,518

10 Claims. (Cl. 74—89)

The present invention relates to an actuator mechanism or assembly primarily for controlling the position of a reciprocable element; and the primary object of the invention is to provide an improved assembly in which the functional objectives will be attained at minimum cost but with maximum effectiveness. The invention is specifically designed, in its illustrated embodiment, for controlling the position of the shiftable disc of an expansible V-pulley in a variable-speed transmission; and it has been illustrated, and will be described, in that environment.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a fragmentary plan view of the illustrated embodiment of my invention;

Fig. 2 is a sectional view, illustrating the operative parts of the actuator mechanism and showing the directly associated portions of a conventional variable speed transmission in fragmentary section;

Fig. 3 is a fragmentary end elevation, taken from the lefthand side of Fig. 2; and Fig. 4 is a fragmentary section taken substantially on the line 4—4 of Fig. 3.

Referring more particularly to the drawings, it will be seen that I have illustrated a fragment of a housing 10 in which is suitably supported a shaft 11 upon which is carried an expansible V-pulley indicated generally by the reference numeral 12 and comprising a pair of mating coned discs 13 and 14. The disc 13 is conventionally fixed to the shaft 11, while the disc 14 is reciprocable toward and away from its fellow. A thrust bearing 15 is suitably supported upon the extended hub 24 of the disc 14. The housing 10 is formed with a port or opening 16, with which the shaft 11 is aligned, and a dished cover plate or carrier 17 is suitably proportioned and designed to cover and close the port 16 in the housing 10.

A bracket 18 is integrally carried within the dished cover plate or carrier 17, and supports a pin 19 upon which is mounted a lever, indicated generally by the reference numeral 20, for oscillation about the axis of said pin 19. The hub 21 of the lever 20 is preferably journalled upon the pin 19, the bore through said hub preferably being flared oppositely from its midpoint, whereby the hub may have some rocking movement in a direction transverse to the axis of the pin 19. Springs 22, 22 are preferably sleeved on the pin 19 on opposite sides of the hub 21 to hold said hub resiliently in a median position on said pin. One arm 23 of the lever 20 is preferably bifurcated to straddle the hub 24 of the disc 14 and to bear upon diametrically opposite points on the outer surface of the thrust bearing 15, as is most clearly illustrated in Figs. 2 and 3.

In the illustrated embodiment of the invention, the carrier 17 is provided with a thickened portion in its perimetral wall, through which is formed an internally threaded bore 25, upon an axis intersecting the arm 26 of the lever 20, throughout the oscillatory path of said lever arm. At its outer end, the bore 25 is enlarged to define a pocket 27 which is preferably coaxial with the threaded portion of the bore 25; and the outer race 28 of an anti-friction bearing is snugly received in said pocket, being held against axial removal therefrom by plates or fingers 29 suitably secured to the carrier 17 and overlapping the bearing race 28. A series of rotatable bearing elements, such as balls 30, is engaged and retained in an inwardly opening annular groove in the race 28; and said balls are also received in a mating groove in the inner race 31 of the bearing. As is most clearly illustrated in Fig. 2, the inner bearing race 31 is axially elongated and projects radially outwardly beyond the periphery of the carrier 17.

A screw 32 is threadedly mounted in the bore 25 and projects into the interior of the race 31. Said screw carries, within the boundaries of the bearing race 31, a key 33, or the like, which is slidably received in a longitudinally extending groove or channel 34 in the inner surface of the bearing race 31. Thereby, screw 32 is mounted for reciprocation relative to the bearing race 31, but is drivingly rotationally connected to said bearing race. The inner end of the screw 32, of course, bears upon the lever arm 26.

In the illustrated embodiment of the invention, a handwheel 35 is sleeved on the projecting portion of the bearing race 31 and is secured thereto by a set screw 36, or the like. Obviously, any other form of manipulating member could be substituted for the handwheel; for instance, a gear or a sprocket or pulley.

It will be obvious that, when the manipulating member 35 is rotated in one direction, the bearing race 31 will be correspondingly rotated and the screw 32 will be carried therewith. Because of the threaded engagement of the screw in the threaded bore 25, such rotation will result in axial movement of the screw 32 in one direction or the other, depending upon the direction of rotation of the manipulable member 35. As the screw moves downwardly, the lever 20 will be swung in a counterclockwise direction, and its bifurcated arm 23 will correspondingly shift the thrust bearing 15 and the disc 14 toward the disc 13 to squeeze the belt 49 outwardly between said discs, thereby increasing the effective diameter of the pulley 12, in a manner which is clearly understood in the art.

The carrier 17 is formed, in the region of the path of movement of the inner end of the screw 32, with a port 37 opening into the interior of the carrier 17, and bounded by opposed walls 38 and 39 disposed in planes transaxial with respect to the screw 32. A stop collar 40 is threadedly carried upon the inner end of the screw 32, and is held in adjusted position upon said screw by a set screw 40'. The stop collar 40 is formed to provide a radial extension 41 for a purpose which will become apparent. Obviously, the port 37 affords access to the stop collar 40 and, when said collar is in one position of rotational adjustment, to the set screw 40'.

A bore or guideway 42 is formed in the thickened portion of the wall of the carrier 17, upon an axis generally parallel with the axis of the bore 25; and an abutment pin 43 is supported in said bore 42. In the illustrated embodiment of the invention, the pin is frictionally retained in adjusted position in the bore 42. A socket 44 is let into the thickened portion of the carrier wall 17 to intersect the outer end of the bore 42 and to provide access to the outer end of the pin 43.

A second bore or guideway 45 is formed in the carrier wall portion and similarly supports an abutment pin 46. As will be clear, the bores 42 and 45 respectively open through the walls 38 and 39 defining the port 37. As is most clearly shown in Fig. 4, the bores 42 and 45 are so located that the pins 43 and 46 are disposed upon axes spaced apart a distance substantially equal to the peripheral dimension of the tongue or projection 41 of the stop collar 40. It will be clear that, as the screw 32 rises, upon counter-clockwise rotation of the manipulating element 35, the stop collar will ultimately reach a level at which, as the projection 41 moves in a counter-clockwise direction as viewed in Fig. 4, it will strike the side of the portion of the pin 43 which projects into the port 37, thereby limiting further counter-clockwise rotation of the manipulating element 35. Similarly, as the screw descends, upon clockwise rotation of the manipulating element 35, the stop collar will ultimately reach a level at which, as it rotates in a clockwise direction, it will strike the side of the portion of the pin 46 which projects into the port 37. Thus, means is provided for stopping the adjustment of the screw 32, in either direction, at a selected point, without the possibility of jamming. Obviously, both ends of both pins 43 and 46 are accessible for adjustment of either pin in either direction, whereby the degree of projection of each pin into the port 37 can be adjusted to select that point in the path of movement of the screw 32 at which the screw will be stopped.

A cover plate 47 is provided for closing the mouths of the port 37 and the socket 44; and said plate may be secured in place in any suitable manner.

Preferably means will be provided for holding the manipulating element 35 against accidental or casual movement. In the illustrated embodiment of the invention, such means comprisees the clicker mechanism 48 of well known characteristics.

I claim as my invention:

1. An actuator assembly comprising a carrier, a lever supported upon said carrier for oscillation about an axis, said carrier being formed with a threaded bore whose axis intersects a portion of said lever throughout the path of said lever, a rotor, means supporting said rotor from said carrier in coaxial relation to said bore for rotation about said axis, said means restraining said rotor against axial movement relative to said carrier, a screw threadedly mounted in said bore and engageable with said lever portion, and means providing an axially-reciprocable, non-rotational connection between said screw and said rotor.

2. An actuator assembly comprising a carrier, a lever supported upon said carrier for oscillation about an axis, said carrier being formed with a threaded bore whose axis intersects a portion of said lever throughout the path of said lever, an anti-friction bearing having an outer race fixed to said carrier in coaxial relation to said bore, an inner race, and rotatable bearing elements axially fixed relative to said races, a screw threadedly mounted in said bore, engageable with said lever portion, and having a portion received within said bearing inner race, and means providing an axially-reciprocable, non-rotational connection between said screw and said bearing inner race.

3. An actuator assembly comprising a carrier, a lever supported upon said carrier for oscillation about an axis, said carrier being formed with a threaded bore whose axis intersects a portion of said lever throughout the path of said lever, an anti-friction bearing having an outer race fixed to said carrier in coaxial relation to said bore, an inner race, and rotatable bearing elements axially fixed relative to said races, said bearing inner race being provided with a longitudinally-extending keyway, a screw threadedly mounted in said bore, engageable with said lever portion, and having a portion received within said bearing inner race, and means carried by said screw and slidably received in said keyway.

4. An actuator assembly comprising a dished carrier formed with a threaded bore leading from the perimeter of said carrier to the interior thereof, the perimetral end of said bore being enlarged to define a pocket, a bearing having an outer race, an inner race and a series of anti-friction rotatable elements confined between said races against axial movement relative thereto, said outer race being snugly received in said socket, means restraining said outer race against axial movement relative to said socket, said inner race being axially elongated and projecting outwardly beyond the perimeter of said carrier, a screw threadedly mounted in said bore and extending into said bearing inner race, and means providing an axially-movable, rotational driving connection between said screw and said inner bearing race.

5. The assembly of claim 4 including a manipulating member sleeved on the outwardly-projecting portion of said bearing inner race, and means securing said manipulating member rotationally to said race.

6. The assembly of claim 4 including a stop collar threadedly adjustably mounted on said screw within the interior of said carrier and cooperable with abutments within said carrier to limit the stroke of said screw.

7. The assembly of claim 6 including a first abutment member carried within said carrier and a second abutment member carried within said carrier, said abutment members being respectively disposed on opposite sides of said stop collar in the direction of reciprocation of said screw, and said stop collar projecting radially from the axis of said screw into cooperating alignment with both said abutment members.

8. The assembly of claim 6 in which said carrier is formed to provide a port opening, in a direction transverse to the axis of said bore, into the interior of said carrier to afford access to said stop collar, said port being bounded by opposed walls spaced apart in the direction of reciprocation of said screw, each of said walls being formed with a guideway generally parallel with the axis of said bore, each abutment comprising a member adjustably supported in one of said guideways, and such member projecting into the space between said walls, and said abutment members being disposed in the path of said stop collar on opposite sides thereof.

9. The assembly of claim 8 in which the relatively remote ends of said abutment members are accessible for adjustment thereof.

10. The assembly of claim 8 in which each such guideway is a perforation open at both ends and in which each such abutment member is a pin frictionally supported in its guideway.

References Cited in the file of this patent

UNITED STATES PATENTS

| 2,277,004 | Reeves | Mar. 17, 1942 |
| 2,293,617 | Myers | Aug. 18, 1942 |
| 2,398,235 | Luenberger | Apr. 9, 1946 |